United States Patent [19]

Dunstan et al.

[11] Patent Number: 4,921,206

[45] Date of Patent: May 1, 1990

[54] SNAP-TOGETHER SOLENOID OPERATED PINCH VALVE ASSEMBLY

[75] Inventors: Harvey J. Dunstan, Wheathampstead; Ian D. Gilbert, St. Albans, both of England; Ervin Fayer, Hollywood, Fla.; George G. Dominick, Miramar, Fla.; Avelino De Oliveira, Ft. Lauderdale, Fla.

[73] Assignee: Coulter Electronics, Inc., Hialeah, Fla.

[21] Appl. No.: 287,193

[22] Filed: Dec. 20, 1988

[51] Int. Cl.5 ................................................ F16K 7/04
[52] U.S. Cl. ......................................... 251/7; 251/4
[58] Field of Search ........................................ 251/4, 7

[56] References Cited

U.S. PATENT DOCUMENTS 4,524,802  6/1985  Laurence et al. .................. 251/7 X
4,653,719  3/1987  Cabura et al. ...................... 251/4 X

FOREIGN PATENT DOCUMENTS 2415422 10/1974  Fed. Rep. of Germany .......... 251/4

*Primary Examiner*—John Fox

[57] ABSTRACT

A solenoid operated pinch valve including a housing and a hollow molded body coupled to said housing by a snap-on connection, a solenoid coil assembly seated within the housing, a plunger accommodated within said solenoid coil assembly for axial movement relative thereto controlled by energization of said solenoid coil assembly and between a pair of positions, said plunger having an end portion extending from the housing into said body and an opposite end portion received within said solenoid coil assembly, the body having a circumferential flange capable of being seated on one end of the housing and a pair of inflexible arms extending from the body in a coaxial direction relative thereto, said arms defining a passage for receiving a conduit across the path of movement of said plunger, a first orthogonal slot and a pair of resilient arms extending to the opposite end of the housing and engagable therewith in a snap-on coupling. One end of the plunger carries a second orthogonal slot. A flexible conduit having longitudinal ears unitary therewith is threadable thorugh the passage with the ears engaged within said orthogonal slots. A spring is provided for biasing the plunger against the flexible conduit to compress same closed, the solenoid coil assembly being energizable to move the plunger linearly against said bias by causing the plunger to pull the conduit open.

21 Claims, 4 Drawing Sheets

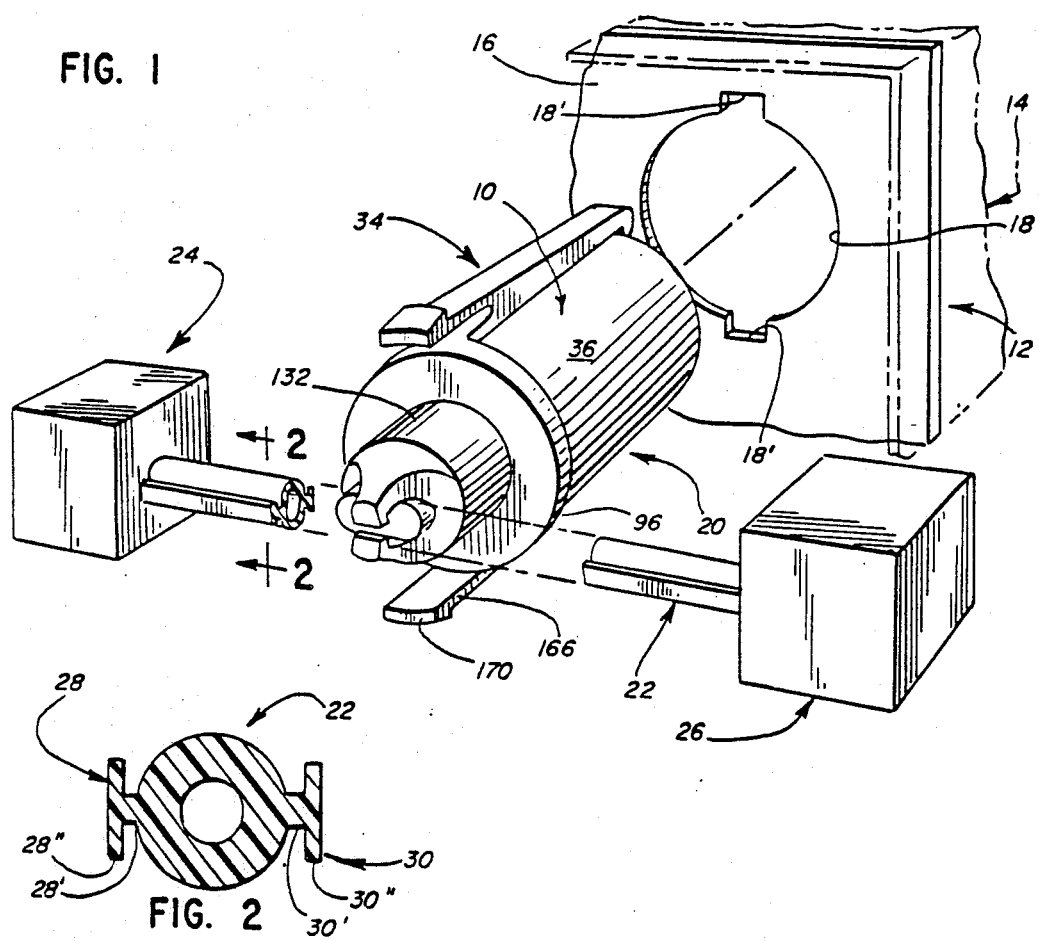
FIG. 1
FIG. 2
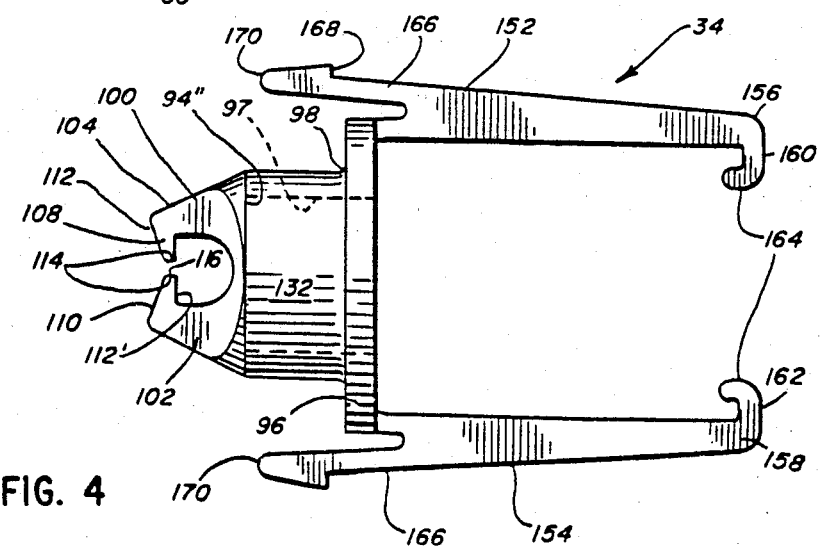
FIG. 4

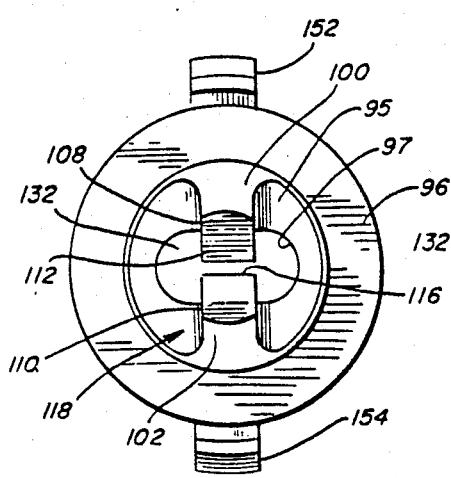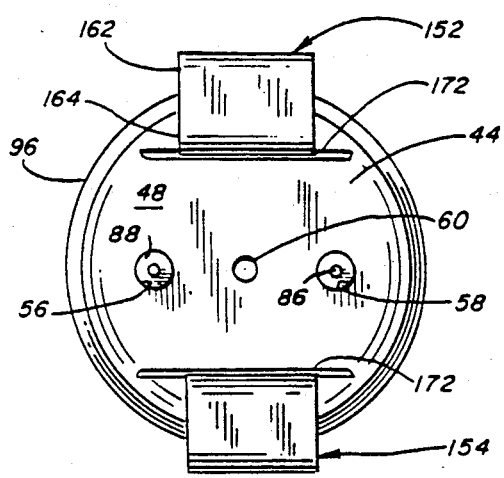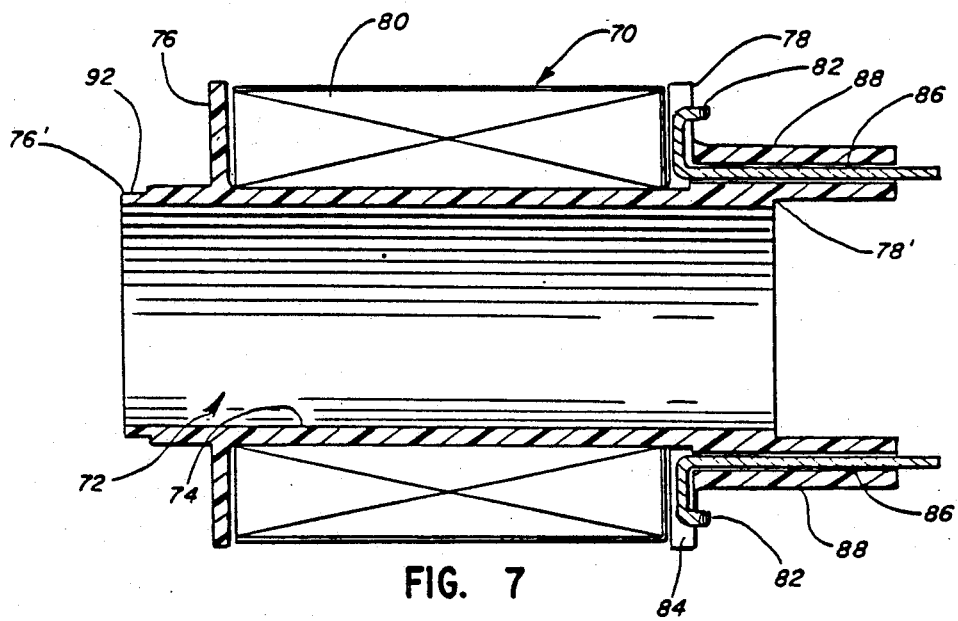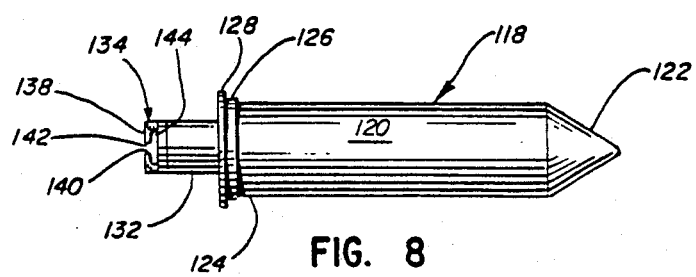

SNAP-TOGETHER SOLENOID OPERATED PINCH VALVE ASSEMBLY

CROSS-REFERENCE TO RELATED PATENTS

This application is directed to improvements upon the subject matter of U.S. Pat. Nos. 3,882,899, 3,932,065 and 4,653,719 granted respectively on May 13, 1975, Jan. 13, 1976 and Mar. 31, 1987, the subject matter of each of said patents being hereby incorporated by reference herein as a part of this application for the disclosure contained therein, each of said patents being owned by the Assignee of this application.

BACKGROUND OF THE INVENTION

This invention relates generally to fluid flow control systems incorporating pinch valves through which fluid carrying conduits are threaded and the valves are operated alternately to act upon said conduits to change the flow conditions therethrough between full flow and cease flow.

More particularly, the invention provides an improved pinch valve for use with a flexible hollow fluid conduit of the type having unitary means capable of being acted upon positively to open same from a compressed closed condition to permit full flow therethrough, said pinch valve being a solenoid operated, snap-in assembly which provides means for acting upon said conduit which enables improved response and reduces wear on the conduit, which is less expensive to manufacture and is easier to assemble and to mount compared to prior pinch valve constructions and, as well, is protected against exterior originated contamination.

The art has provided many different types of apparatus to perform automated analysis, many types involving the transfer of liquid in such a manner as to provide quantitatively accurate dilutions and physical transfer of precise volumes of liquid from one location to other locations.

Difficulties were encountered in switching from one flow path to another. One transfer system involved the use of check valves which are normally one-way direction flow valves. Such valves are subject to sealing or seating problems which may be caused by build-up sediment on the sealing mechanism. Thus, error is introduced due to the extra flow past the sealing location occasioned by slow response to change in the condition. Other problems were encountered, such as backlash occuring due to time delay between pressure change to close the valve and the time the valve actually is closed. More liquid than desired may be permitted past the valve before it has the opportunity or time within which fully to close off flow. Swelling was another problem encountered with many check valve constructions. Goals such as instantaneous response were not reached.

In U.S. Pat. Nos. 3,882,889 and 3,932,065, a solution was offered to many of the above mentioned problems. There was provided a pneumatically operated pinch valve of the make-before-break type which operated upon fluid paths defined by flexible conduits. A valve shell was provided which was formed by assembling several plastic molded parts, said shell also being provided with piston means, namely a pair of plastic molded pistons assembled within the shell and slidable linearly therewithin under spring bias. Windows were defined by the shell members to enable passage therethrough of flexible conduits across the path of the pistons. A post also was provided on one of the shell parts extending across the width of the shell and was disposed between the pistons, said post cooperating with at least one of the pistons to enable a conduit to be compressed, stopping flow therethrough. Notwithstanding the substantial benefit providedd by these patent pinch valves and the liquid transfer systems employing same, problems were encountered which were yet to be addressed.

One of these problems involved one of the characteristics of the elastomeric tubing employed as the conduits. This type of tubing possesses a memory to maintain its tubular configuration so as not to interfere with passage therethrough. Such memory normally causes the tubing to return to its open condition after it has been compressed closed, as by pinching a localized section thereof. However, when compressed for an extended period of time, the tubing loses its memory and fails quickly to recover to its fully open condition after prolonged compression. This phenominon may be due to cold flow and often is unpredictable and contributes to slow or uncertain response occurances. The tube can be stuck closed due to the nature of the liquid being transported. Manual override means have been utilized to permit the conduit to be maintained in open condition so that the valve could be rendered inoperative without compressing the conduit. Such additional provisions increase fabrication and assembly cost and do not meet occasions where the conduits are desired to be maintained compressed closed yet to be instantaneously responsive when rendered operative to enable flow.

The problem of restoring the flexible conduit from its compressed condition was considered with the solution thereto offered by the invention disclosed in U.S. Pat. No. 4,653,719. Here, a molded flexible conduit was provided with unitary diametrically opposed longitudinal ear formations extending outwardly of the conduit. A pinch valve was provided for accommodating the modified flexible conduit, said pinch valve having a structure similar to the earlier mentioned pinch valves but having slot means formed in one of the pistons and in the stationary post, each ear formation of the modified flexible conduit being drawn through said slot means to extend across the path of said one piston to enable the piston to compress the conduit against said stationary post in one condition of the valve and to effect a pulling force upon the ear formations simultaneously to enable the conduit to be pulled in opposite directions after the conduit has been compressed, either momentarily or subsequent to a prolonged compressed state. Attention should be directed to the use of two flexible conduits in the systems concerned, two conduits being threaded through the valve, one being normally open and the other normally closed. The said valves are operated first to close the normally open conduit, then to proceed to a state where both conduits are closed and then, finally, to a state where the normally compressed conduit is opened by causing force to be applied to both the ear formations. Only one of the flexible conduits need possess the ear formations.

Improvement in the purchase afforeded to both ear formations which are provided on the patented flexible conduit has been sought so as to improve response time and reduce stress placed on the ear formations which could result in tearing thereof. The nature of the purchase provided by like slots formed in the stationary and movable elements of the pinch valves was likely to result in greater stress applied to the cross-bar of the ear formation than to the juncture of the radial portion thereof with the conduit wall. The cross-bar portion may slip within the slot as the force is applied by pulling upon the opposite ear by the piston through which the formation is threaded. The invention herein contemplates improving upon the prior structure by providing a construction which will direct the restraining force to a location close to the juncture of the radial portion of the ear formation with the conduit wall. In this event, the pulling force may be more effective on the conduit itself to effect full opening thereof and is likely to improve the response time.

Another problem to be considered is the possible contamination of the interior portions of the aforementioned pinch valve from the exterior thereof and attributable to the open construction of the aforementioned patented pinch valve assemblies.

The valve body or housing of the aforementioned prior pinch valve assemblies is formed as an assembly of plural molded parts to form the somewhat open configuration thereof. Since the freedom of movement of the pistons in the relatively open housing is essential, possible entry of debris from the exterior of the housing may interfere with the motion of the pistons or the operation of the exposed spring. Debris may take the form of lint, of solidifying liquids, of adhesive-like materials, gels or the like from spills or other sources. Accordingly, the reduction of open access to the interior moving parts of the pinch valve is desirable but as yet has not been available. The invention contemplates providing a housing for the pinch valve assembly to which casual access is denied.

The above mentioned patented pinch valve assemblies are constructed to operate on a pair of conduits and may not be suitable for use in respect of only one conduit, a portion of the valve being redundant when only a single conduit is employed. Provision of a pinch valve construction which is operable where only a single conduit is employed yet which is at least as effective as the prior patented pinch valves to which reference has been made also is desirable.

SUMMARY OF THE INVENTION

The invention provides a solenoid operated pinch valve assembly operable upon at least one flexible conduit capable of carrying a liquid and having longitudinal ear means unitary therewith along a portion of the length thereof, said pinch valve assembly comprising a housing and a body, means on said body effecting a snap-in coupling removably securing said body in communicating relationship with said housing, solenoid means within said housing, a first rigid formation unitary with said body and extending axially outwardly thereof in one direction, said body having an axial chamber opening to the opposite ends thereof, plunger means disposed within said chamber, means in said first rigid formation for accommodating the flexible conduit therethrough across the path of said plunger, orthogonal slot means defined in both said rigid formation and said plunger means, said orthogonal slot means having a cross-sectional configuration capable of accommodating the unitary formations of the flexible conduit therethrough, resilient means within said chamber and housing about said plunger means for biasing said plunger means in a direction toward said rigid formation normally to compress the flexible conduit thereagainst to prevent flow therethrough and said solenoid means capable of being energized to effect linear movement of said plunger means against said bias to pull said conduit from the compressed condition to an open condition.

BRIEF DESCRIPTION OF THE DRAWINGS

FIG. 1 is a perspective view of the pinch valve constructed in accordance with the invention illustrated in the course of being mounted to a panel with the test instrument for use in the liquid transfer system thereof, the latter being represented diagrammatically;

FIG. 2 is a sectional view taken transversely through the flexible conduit illustrated operably associated with the pinch valve represented in FIG. 1;

FIG. 4 is a longitudinal view of the body portion of the pinch valve represented in FIG. 1;

FIG. 5 is an end view of the body portion of the pinch valve represented in FIG. 1;

FIG. 6 is an end view of the pinch valve represented in FIG. 1 taken in a direction outward from the panel illustrated in said FIGURE;

FIG. 7 is a fragmentary detail in section illustrating the solenoid coil bobbin sub-assembly incorporated in the pinch valve as represented in FIG. 3;

FIG. 8 is an elevational view of the plunger incorporated in the pinch valve as represented in FIG. 3;

DESCRIPTION OF PREFERRED EMBODIMENTS

Figure 3:
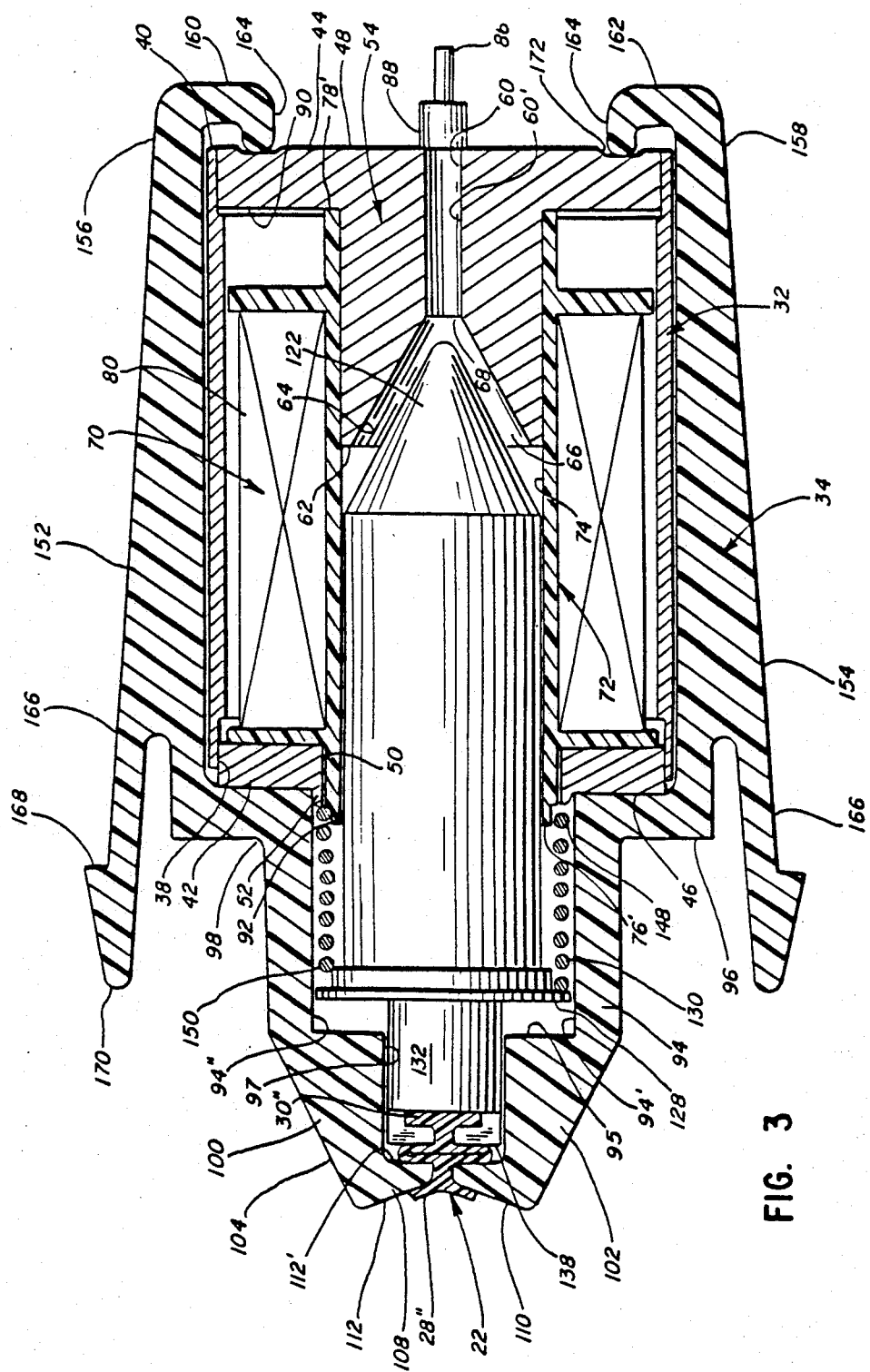
FIG. 3 is a longitudinal section view of the body portion of the pinch valve represented in FIG. 1.

The pinch valve assembly according to the invention is intended for use within fluid flow systems employing flexible conduits defining fluid paths, said pinch valve being selectively operated to direct the flow of fluids along said paths from one location to another. In particular, the pinch valve provided by the invention is capable of accommodating a flexible fluid conduit disclosed in U.S. Pat. No. 4,653,719, said conduit being provided with diametrically opposed longitudinal ear formations extending outwardly from the conduit and adapted to be received within slot means provided in the pinch valve to enable the conduit to be pulled diametrically when the valve is operated to open said conduit to permit flow therethrough subsequent to the conduit being in compressed condition preventing flow through.

Generally, the flexible conduit is arranged transversely across the path of means provided in the pinch valve assembly to enable said means to compress said conduit effecting cessation of flow therethrough and to reverse the direction of said means positively to force the conduit to assume a fully open condition from said compressed condition.

Briefly, the pinch valve according to the invention is solenoid operated and preferably includes a housing and a hollow molded body coupled to the housing by a snap-in connection, a solenoid coil seated within the housing, a plunger accommodated within the solenoid coil for axial movement relative thereto controlled by the energization of said coil and between a pair of positions, said plunger having an end portion extending from the housing into the body and an opposite end portion received within said solenoid coil, the body having a circumferential flange capable of being seated on one end of the housing and a pair of inflexible arms extending from the body in a direction coaxial therewith, said arms having portions defining a passage for receiving a flexible conduit across the path of the plunger, said conduit having a pair of diametrically opposite longitudinal ear formations, said body being provided with a pair of resilient arms extending from the circumferential flange axially toward the opposite end of the housing and having free ends provided with formations capable of engaging the housing in a snap-on coupling. The one end of the plunger carries an orthogonal slot formed therethrough capable of receiving one ear of said conduit and being disposed so as to extend into said passage. Spring means are seated within said body for biasing said plunger in the most outwardly extended disposition thereof. The inflexible arms define a second orthogonal slot for receipt of the other, opposite ear of the conduit. One embodiment of the invention provides axial open access to the second orthogonal slot while a second embodiment of the invention utilizes bridge formation linking the pair of inflexible arms to close off open access axially to the said second orthogonal slot.

Referring now to the drawings, in FIG. 1, the liquid transfer system, in which the pinch valve of the invention is intended to be incorporated, is designated generally by the reference character 10 and itself is incorporated in a test instrument 12 having a housing 14 which includes therein an upstanding panel 16 having plural openings 18 (one of which is represented) through which pinch valves of the invention are intended to be received, each of the pinch valves (only one being shown) being designated generally by reference character 20. The liquid transfer system 10 includes at least one flexible conduit 22 carrying liquid from one location 24 to another location 26 represented diagrammatically in FIG. 1.

Referring to FIG. 2, the flexible conduit 22 is formed of elastomeric material, preferably by extrusion molding or injection molding processes and carries unitary elongate ear formations 28, 30 extending radially outwardly from opposite sides of said conduit 22. At least one of the ear formations 28, 30 is capable of being pulled in a direction normal to the longitudinal axis of the conduit with the other ear formation being restrained. Each ear formation is formed of a radial portion 28' and 30' respectively, each having across-bar 28" and 30" on their free ends. Preferably the ear formations are symmetric.

As illustrated in FIG. 3, the pinch valve 20 is arranged normally with the conduit 22 in compressed condition. When the valve is actuated, as will be described, the one ear formation 30 is pulled while the opposite ear formation 28 is restrained, to open the conduit 22 and permit full flow therethrough.

The pinch valve 20 comprises a metal housing 32 and a plastic molded body 34 coupled thereto. The housing 32 is formed of a cylindrical metal tube 36 having a pair of opposite open ends 38 and 40. One open end 38 of housing 32 receives a cover 42 fitted therewithin while opposite open end 40 carries a cover or end piece 44 fitted therewithin to complete the housing 32. The surfaces 46 and 48 of covers 42 and 44 are generally even with the respective open ends 38 and 40 of tube 36 when the pinch valve 20 has been assembled. Cover 42 carries a circular central opening 50 and an annular raised portion or rib 52 formed thereon immediately adjacent the periphery of the central opening 50. The cover 44 carries a coaxial right cylindrical portion 54 unitary therewith, said portion 54 extending into the tube 36 when the cover 44 is installed therein to close off the open end 40 of housing 32. The cover 44 also is provided with a pair of circular openings 56 and 58 at diametrically opposite locations relative to a central opening 60, said openings 56 and 58 being equispaced from the opening 60 and the periphery of cover 44. The free end 62 of the right cylindrical portion 54 carries a conical socket or recess 64 opening at its mouth 66 to said free end and, at its inner end, coaxial with axial bore 60' (which opens to said central opening 60). The axial bore 60' serves to vent the interior of the housing 32. This venting enables the air to be exhausted from the housing 32 to enable the plunger 118 (to be described hereinafter) to be moved.

A solenoid assembly 70 (FIGS. 3 and 7) is seated within the housing 32. Solenoid assembly 70 comprises a bobbin 72 formed of electrical insulating material. Bobbin 72 is formed as a tube 74 having a pair of opposite end flanges 76 and 78 spaced inwardly of the opposite ends 76' and 78' thereof. An electrical coil 80 is wound on said tube 74 between the end flanges 76 and 78 and has a pair of electrical lead ends 82 passing through end opening slots formed in end flange 78. A pair of electrical contacts 86 are passed through a pair of tubes 88 respectively formed unitary with said one end flange 78 and are sealed therein at their outlet with their free ends extending outward thereof in an axially parallel direction, each of said electrical contacts 86 and electrical lead ends 82 having their free ends exposed (bared). When the cover 44 is installed in the housing 32 to close off same, the electrical lead ends 82 engage the inner surface 90 (FIG. 3) of the cover 44 and the tubes 86 extend through the openings 56 and 58. The electrical contacts 86 have a length sufficient to extend outward of the cover 44 so that electrical connection can be made to the solenoid assembly 70. The cover 42 and cover 44 (including the formation 54 thereof) serve as flux spacer means, and the tube 36 serves as a flux guide for and surrounding the solenoid coil assembly 70. The opposite end of the tube 74 carries a reduced diameter portion 92 and extends through the axial opening 50 of cover 42 with said reduced diameter portion 92 extending outward of the annular raised portion 52 of said cover 42. When the solenoid assembly 70 is installed within the housing 32, the reduced diameter portion 92 serves as a seat for the coil spring to be described hereinafter.

Referring to FIGS. 3, 4 and 5, the body 34 of the pinch valve 20 is a one piece member molded, preferably, of acetal resin, and has a cylindrical portion 94 with a circumferential flange 96 at one end 98. Cylindrical portion 94 is provided with an outwardly opening chamber 94' having a uniform inner diameter. Chamber 94' includes a floor 95 at the inner end 94" thereof. A pair of rigid arms 100 and 102 (FIG. 4) are formed unitary with the cylindrical portion 94 of body 34 extending in an axial direction outward therefrom. Each arm 100 and 102 has an inwardly canted outer surface 104 and a curved inner surface 106. The arms 100 and 102 each terminate in inwardly directed flanges 108 and 110 respectively, the outer surface 112 of each being inclined, the flanges 108 and 110 extending toward each other to terminate in spaced apart ends 114 defining an orthogonal slot 116.

Referring to FIG. 8, a plunger 118 is provided which functions to act upon the flexible conduit 22 so as to compress the same and includes slot means defined at one end thereof to receive one ear 30 of the conduit drawn therethrough, the opposite ear 28 of said conduit adapted to be drawn through the slot 116. The plunger 118 has an elongate right cylindrical solid body 120, one end 122 being conically tapered for seating within the socket or recess 64 (FIG. 3) when the plunger 118 is installed within the housing 32. The gap between the end 122 and the floor of the recess is carefully selected so that when the solenoid 70 is non-energized, said gap is relatively small, i.e. preferably the distance the plunger 118 is required to be linearly moved to pull the compressed conduit22 to its open condition. There is a squared relationship between the power required by the solenoid to move the plunger 118 and the distance moved. It is highly desirable to operate the pinch valve assembly 20 at the minimum power requirement, hence the small gap.

The opposite end 124 of the plunger 118 is provided with an annular flange 126 and a second annular flange 128 having a diameter larger than the diameter of flange 126, flange 128 being of lesser thickness than flange 126. The flanges 126 and 128 are concentric and unitary with the plunger 118 to define a seat for one end of helical coil spring 130. The end 124 of plunger 118 terminates in a formation 132 having an oval cross-section generally conforming to the configuration of the passageway 97 so that it may pass freely therethrough. The free end of formation 132 includes a pair of right angle configured legs 134 unitary therewith, said legs 134 extending in an axially parallel direction relative to the body 120 of plunger 118, the center axes of said formation 132, said plunger body 120 and the tapered end 122 being coaxial. Legs 134 terminate in coplanar end portions 138, the facing free ends 140 of which are spaced apart to define an entrance 142 to the orthogonal slot 144 defined by said legs 134. When the plunger118 is received within the chamber 94', the formation 132 passes through the oval passageway 97 and extends through the floor 95 and into the through passage defined between arms 100 and 102 with end portions 138 capable of engaging the inner surfaces 112' of the flanges 108 and 110 of arms 100 and 102.

A helical spring 130 (FIG. 3) has one end 148 thereof being received within the chamber 94' defined within the hollow cylindrical portion 94 of said body 34 and the opposite end 150 seated on the seat provided by the reduced diameter portion 92 of bobbin tube 74 and the annular portion 52 of cover 42. The end 148 of spring 130 rests on the seat defined by the annular flanges 126 and 128 of plunger 118.

A pair of diametrically oppositely disposed resilient arms 152 and 154 (FIGS. 3, 4 and 5) are formed at the periphery of the circumferential flange 96 of the body 34 and extending outwardly therefrom in a longitudinal direction generally axially of said cylindrical tube 36 of housing 32. Each resilient arm 152 and 154 is tapered toward its free end 156 and 158 respectively and terminates thereat in inwardly directed flanges 160 and 162, each having an enlarged hook-like end 164. The thickest portion of each arm 152 and 154 has a thin section 166 extending therefrom and terminating in a wedge formation 168 having a narrow free end 170.

Referring to FIG. 6, a pair of grooves 172 are formed in the outer surface of the cover 44. When the solenoid assembly 70 and covers 42 and 44 are installed in the cylindrical tube 36 to complete the housing 32, the plunger 118 is installed, with the conically tapered end 122 thereof seated within the recess 64 formed in portion 54 of the cover 44, and the opposite end 124 is seated within the chamber 94' as described above. Spring 130 is compressed between the floor 95 of chamber 94' and the cover 42. The resilient arms 152 and 154 are spread apart manually, and the hook-like ends 164 of flanges 160 and 162 are spread apart manually, and the hook-like ends 164 of flanges 160 and 162 are engaged with the outer circumferential surface of the cylindrical tube 36 of the housing 32. The body 34 and housing 32 then are manipulated to move same axially toward one another compressing the spring 130. When flanges 160 and 162 of the resilient arms 152 and 154 reach the end of the housing 32, the arms 152 and 154 are released and spring one toward the other. The cover 44 is urged inward of the housing 32 against the spring bias so that the hook-like ends 164 are engaged within the grooves 172 in a snap-in(snap-on) coupling, completing the assembly of the pinch valve assembly 20.

As shown in FIG. 1, the flexible conduit 22 can be drawn or threaded through the pinch valve assembly 20 across the path of the plunger 118 through the orthogonal passage defined between the arms 100 and 102, one ear 30 passing through the slot 144 (carried by plunger 118 and which can be described also as an orthogonal slot). The radial portion of ear 28 passes through the slot 116 while the cross-bar 28" thereof engages the inclined surfaces 112 of said flanges 108 and 110. The plunger 118, as mentioned, is biased to compress the conduit 22 as shown in FIG. 3. When the solenoid assembly 70 is energized, the plunger 118 is driven inward of the end 76' of electrical coil 80 of said assembly 70 in a linear direction toward the bottom of the recess 64 exercising sufficient force to pull the ear formation 30 and, therewith, exercise force upon the conduit 22 to pull same apart from the heretofore assumed compressed condition, the opposite ear 28 being restrained by the flanges 108 and 110 of arms 100 and 102. Since the flanges 108 and 110 formed to terminate in narrow ends 114, the restraining force is exercised close to the tubular wall of conduit 22 itself rather than being exercised primarily upon the cross-bar and radial portion connection. This is believed to reduce possible strain on the ear formation which may result in tearing thereof or causing the ear formation 28 to slip through the slot 116.

Another useful benefit of the pinch valve of the invention is that when the pinch valve assembly is introduced into one of the circular openings 18 formed in the support panel 16, as represented in FIG. 1, the resilient arms 152 and 154 are guided through diametrically opposed notches 18' and snapped back so that the wedge formations 164 engage the panel 16 and serve as limit means for the pinch valve assembly 20. Thus mounting and dismounting of the pinch valve is facilitated, a particularly beneficial advantage where many of such valves are employed and must be mounted and dismounted easily and quickly. Thus the resilient arms 152 and 154 are bifunctional. Further, the arms 152 and 154 engaged in the notches 18' also prevent the valve assembly 20 from rotating when installed on the panel 16.

Figure 9:
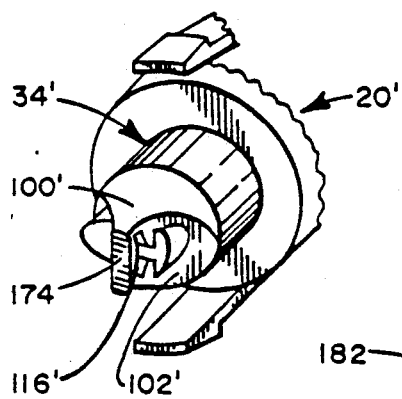
FIG. 9 is a fragmentary perspective view of a modified embodiment of the invention.
Figure 11:
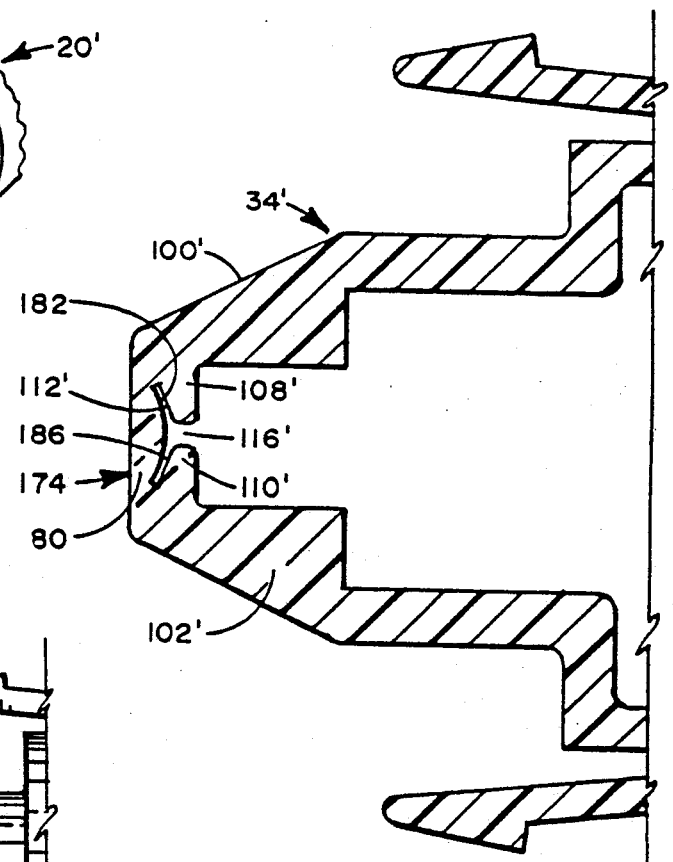
Figure 10:
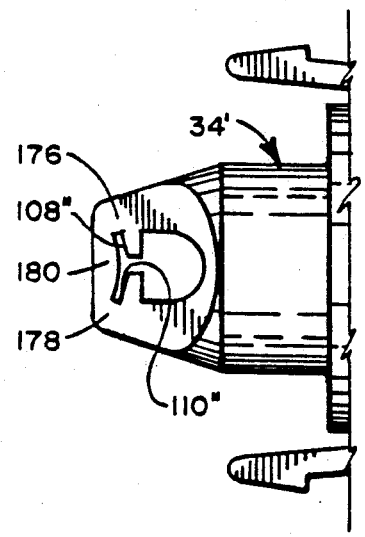
FIG. 10 is a fragmentary detail of the modified embodiment of the invention partially illustrated in FIG. 9; and, FIG. 11 is an enlarged fragmentary detail in section of the embodiment of the invention partially illustrated in FIG. 9.

The pinch valve assembly 20 according to the invention may be modified as illustrated in FIGS. 9, 10 and 11 wherein said modified assembly is designated by reference character 20'. The assembly 20' is substantially identical to the assembly 20 except that the free axially directed access to the orthogonal slot 116' here has been prevented. Instead of the ends of the arms 100 and 102 being free and terminating in the flanges 108 and 110, a bridge formation 174 is provided across the ends of arms 100' and 102', said bridge formation 174 providing the forwardmost portion of the body 34' of said assembly 20'. The bridge formation 174 comprises a pair of legs 176 and 178 integral with the ends of arms 100' and 102' and a bridge 180 joining said legs. The underside 182 of the bridge 180 is curved. The dimensions of the legs 176 and 178 are selected to space the bridge from the inclined surfaces 112" of converging flanges 108' and 110' sufficient to define a wing-shaped gap 186 between the underside 182 of the bridge 180 and the inclined surfaces 112" of said flanges 108' and 110'. The wing-shaped gap 186 is open to opposite sides of the body 34' and is sufficient to accommodate the cross-bar 28" of ear formation 28 when the conduit 22 is passed across the path of the plunger 118 with the radial portion 28' of ear formation 28 of said conduit passing through the orthogonal slot 116' defined between the free ends of said flanges 108' and 110'. The corners 108" and 110" of said flanges are smoothed so as to provide a flared entrance 188 to said slot 116'.

The modified valve assembly 20' is advantageous in that the movement of the cross-bar 28" is restrained, the conduit 22 being prevented from entering the orthogonal slot 116' when impressed with the compressive force of the plunger 118' during compression of said conduit. In addition, the restraint exercised upon the movement of the cross-bar 28" of ear formation 28 by the configuration of the gap 186 prevents the juncture of the ear 28 with the body of the conduit from being cut by the otherwise sharp corners of the flanges 108' and 110' during pulling of the conduit to its open condition. Additionally, under stress, it may be possible for the arms 100 and 102 to spread away one from the other.

Changes may be made in the configuration of pinch valve assembly of the invention without departing from the spirit and scope thereof as defined in the appended claims. The valves 20, 20' are effective for use with flexible conduits which do not carry the ear formations, or may be utilized with multiple conduits with minor changes in the dimensions of the arms which define simple cross-passageways, lengthening said arms, changing the location of the angular formations or providing extensions of said arms to accommodate flexible conduits therethrough across the path of the plunger or its equivalent. The orthogonal slot defined by the legs 134 may be supplemented by a through slot formed in the plunger 118. Other minor changes will likely occur to one skilled in the art without departing from the scope of the invention as claimed hereinafter.

What we claim is:

1. A solenoid operated pinch valve assembly operable upon at least one flexible conduit capable of carrying a fluid and having longitudinal ear means unitary therewith along a portion of the length thereof; said pinch valve assembly comprising: a housing and a body, means on said body removably securing said body in communicating relationship with said housing, solenoid means within said housing, a first rigid formation unitary with said body and extending axially outwardly thereof in one direction defining a passage therebetween for receiving the flexible conduit therethrough, said body having an axial chamber opening to the opposite ends thereof, linearly reciprocable plunger means disposed within said chamber and housing and having one end disposed within said solenoid means and an opposite end seated within said chamber, orthogonal slot means of size and configuration capable of accommodating the ear means of the flexible conduit therethrough and across the path of said plunger means, resilient means within said chamber for biasing said plunger means in one direction normally to compress the flexible conduit against said rigid formation to place said flexible conduit in a cease flow compressed condition and said solenoid means capable of being energized to effect linear movement of said plunger means against said bias to pull said conduit from the compressed condition to an open condition permitting flow therethrough.

2. The pinch valve assembly as claimed in claim 1 in which said plunger means comprise an elongate body having first and second end formations, said orthogonal slot means comprising a first slot defined by said rigid formation and a second slot defined by said first and second end formations.

3. The pinch valve assembly as claimed in claim 2 in which said second end formation is conically tapered and flux spacer means and flux guide means for said solenoid means, said flux spacer means including first and second cover means at opposite ends of said housing, said first cover means having passage means accommodating said plunger means therethrough and said second cover means including a conically recessed portion arranged to receive said second end formation of said plunger means therein whereby to assure linearity of movement thereof.

4. The pinch valve assembly as claimed in claim 3 and said securing means comprise a pair of resilient arms unitary with said body, each resilient arm terminating in an inwardly extending hook formation and said means for receiving said arm means comprise groove means formed in the exterior surface of said second cover means capable of receiving said hook formation engaged therewith.

5. The pinch valve assembly as claimed in claim 1 in which said rigid formation comprises a pair of arms having facing surfaces defining said passage, said arms having converging flanges, said flanges having facing free ends, said orthogonal slot means comprising a first orthogonal slot defined by said free ends and a second orthogonal slot formed in said plunger, a bridging formation integral with said free ends and arranged to block axial access to said first orthogonal slot, said bridging formation defining with said flanges a wing-like slot opening to the sides of said rigid formation and to the entrance to said first orthogonal slot whereby to restrain axial movement of said ear formation accommodated therein during the operation of said valve assembly.

6. The pinch valve assembly as claimed in claim 1 in which said rigid formation comprises a pair of arms having facing surfaces defining said passage, an end bridging formation integral with said arms, flange means unitary with said arms and disposed spaced from said end bridging formation, said flange means having facing free end surfaces, said orthogonal slot means comprising a first orthogonal slot defined by said free end surfaces and a second orthogonal slot formed in said plunger means, and a cross-slot defined between said end bridging formation and said flange means, said cross-slot communicating to said first orthogonal slot and having a configuration capable with said orthogonal slot means of accommodating said ear means when the conduit is received within said passage whereby distortion of said ear means is materially reduced during operation of said valve assembly.

7. The pinch valve assembly as claimed in claim 6 in which said flange means comprises a pair of inwardly inclined converging flanges, said end surfaces including at least a pair of facing rounded corners defining a wide mouth entrance to said first orthogonal slot.

8. The pinch valve assembly as claimed in claim 1 in which said securing means comprise means on said body effecting a snap-on coupling with said housing.

9. The pinch valve assembly as claimed in claim 1 in which said securing means comprise resilient arm means unitary with said body and extending outwardly thereof in a direction opposite to said one direction and along said housing an axial distance sufficient to engage one end of said housing and means at said one end of the housing for receiving said arm means.

10. The pinch valve assembly as claimed in claim 9 in which said housing is tubular in configuration.

11. The pinch valve assembly as claimed in claim 9 in which said resilient arm means comprise a pair of resilient arms, each terminating in an inwardly extending end flange formation and said means for receiving said arm means comprise groove means at said one end of said housing located to receive said end flange formations.

12. The pinch valve assembly as claimed in claim 9 in which said housing comprises an open-ended cylindrical tube, first cover means seated within one end of said tube and second cover means seated within the opposite end of said tube, said means for receiving said arm means comprising grooves formed in said second cover means, said arm means terminating in inwardly extending end flange formations and said groove means capable of receiving said end flange formations.

13. The pinch valve assembly as claimed in claim 12 in which said first and second cover means comprise flux spacer means for said solenoid means and said tube comprises flux guide means therefor.

14. The pinch valve assembly as claimed in claim 1 in which said rigid formation comprises a pair of arms having facing surfaces defining said passage and flange means having facing free ends spaced apart, said orthogonal slot means being defined by a first orthogonal slot formed by said free ends and an orthogonal slot formed in said plunger.

15. The pinch valve assembly as claimed in claim 14 in which said facing surfaces are curved.

16. The pinch valve assembly as claimed in claim 14 in which said flange means have outer surfaces inwardly inclined toward each other.

17. The pinch valve assembly as claimed in claim 14 in which said flange means have outer surfaces inwardly inclined toward each other.

18. The pinch valve assembly as claimed in claim 14 in which said flange means have a tapered outer surface and an opposite surface.

19. The pinch valve assembly as claimed in claim 14 and each of said end formations is formed as a flange having inner and outer surfaces, the inner surfaces of said flanges being coplanar, said outer surfaces being inclined inwardly but being oriented normal to the outer surface of each arm.

20. A solenoid operated pinch valve assembly operable upon at least one flexible conduit capable of carrying a fluid and having longitudinal ear means unitary therewith along a portion the length thereof; said pinch valve assembly comprising an open-ended hollow housing and a body, means on said body removably securing said body in communicating relationship with said housing, solenoid means within said housing, a first rigid formation unitary with said body and extending axially outwardly thereof in one direction defining a through passage therebetween for receiving the flexible conduit therethrough, said body having an axial chamber opening to opposite ends thereof, linearly reciprocable plunger means disposed within said chamber and housing and having one end disposed within said solenoid means and an opposite end seated within said chamber, orthogonal slot means constructed of size and configuration capable of accommodating said ear means therethrough and across the path of said plunger means, resilient means within said chamber for biasing said plunger means in one direction normally to compress the flexible conduit against said rigid formation to place said flexible conduit in cease flow compressed condition, said rigid formation formed of a pair of arms having facing surfaces defining said passage, converging flange means on said arms extending from said facing surfaces and having facing end surfaces spaced one from the other and a bridging end formation at the outermost portion of said rigid formation linking said arms and said bridging end formation and said flange means defining an open-ended cross-slot therebetween, said orthogonal slot means comprising a first orthogonal slot defined between said end surfaces and a second orthogonal slot defined in said plunger means, said cross-slot opening between the ends thereof to said first orthogonal slot, said cross-slot and first orthogonal slot together accomodating a portion of said ear means therethrough and an opposite portion of said ear means being accommodated within said second orthogonal slot, resilient means within said chamber for biasing said plunger means in one dirction normally to compress said flexible conduit therethrough and said solenoid means operable to effect linear movement of said plunger means against said bias to pull the conduit from the compressed condition to an open condition permitting flow through said conduit.

21. The pinch valve assembly as claimed in claim 20 and means for establishing a snap-in coupling between said body and said housing, said last mentioned means comprising a pair of resilient arms unitary with said body and extending axially along said housing, said arms each terminating in a inwardly extending flange formation, first and second covers seated at the opposite ends of said housing respectively, a passage formed in said first cover for receiving said plunger means therethrough and said second cover having exterior groove means capable of receiving said flange formations to establish said snap-in coupling.

* * * * *